March 28, 1944.  J. W. WHITE  2,345,164
HYDRAULIC STEERING STABILIZER
Filed Jan. 3, 1939  2 Sheets-Sheet 1

INVENTOR.
JOHN W. WHITE
BY  A. E. Wilson
ATTORNEY.

March 28, 1944.    J. W. WHITE    2,345,164
HYDRAULIC STEERING STABILIZER
Filed Jan. 3, 1939    2 Sheets-Sheet 2
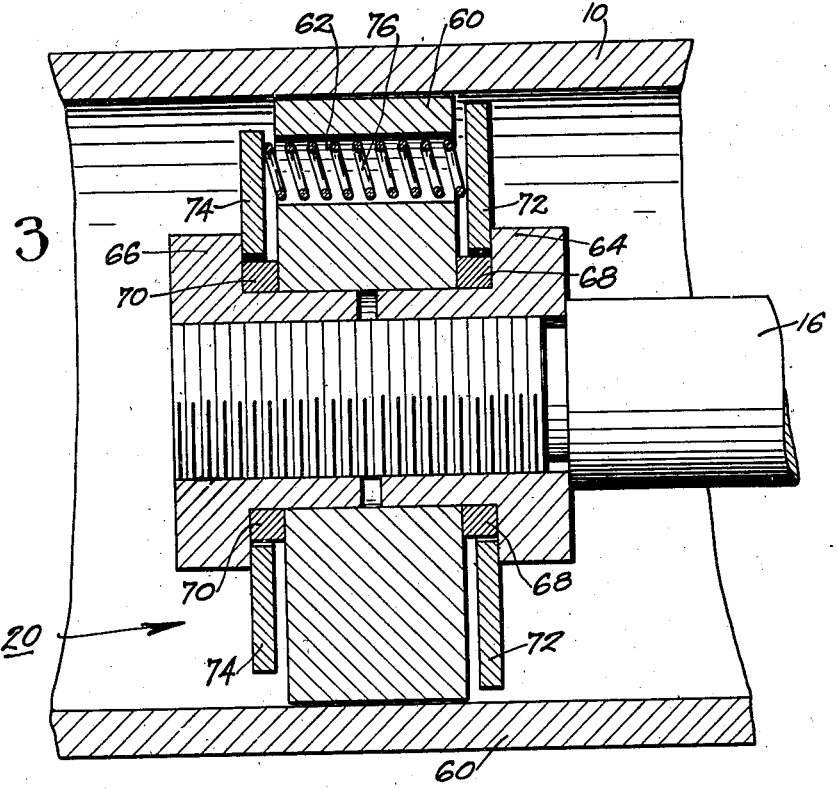
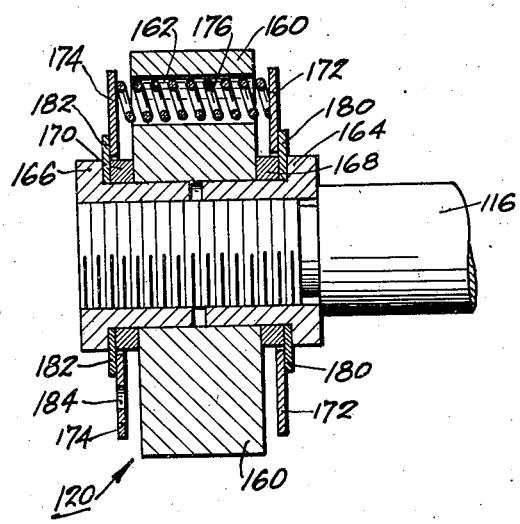
INVENTOR.
JOHN W. WHITE
BY  A. E. Wilson
ATTORNEY.

Patented Mar. 28, 1944

2,345,164

UNITED STATES PATENT OFFICE 2,345,164

HYDRAULIC STEERING STABILIZER

John William White, South Bend, Ind., assignor to Bendix Aviation Corporation, South Bend, Ind., a corporation of Delaware Application January 3, 1939, Serial No. 248,991

2 Claims. (Cl. 280—90)

This invention relates to stabilizing devices, and more particularly to hydraulic stabilizers intended for use in connection with the steering mechanisms of vehicles; however, the invention is not limited to stabilizing steering mechanisms since it is capable of use in many other mechanisms.

When used for stabilizing the steering mechanisms of vehicles, this invention consists of a liquid filled cylinder having a piston movable therein. The cylinder and piston interconnect a movable part of the steering mechanism and a fixed part of the vehicle. The piston may move freely in the cylinder during normal steering operations of the vehicle, and may lock to momentarily delay or interrupt the flow of liquid through or around the piston when the velocity of the piston within the cylinder exceeds a predetermined speed. The stabilizing device therefore does not interfere with the normal operation of the steering mechanism; however, when the steering mechanism is subjected to shock caused, for example, by one of the wheels striking an obstruction or by a tire blowing out, which would accelerate the movable elements of the steering mechanism, the valve member of the piston momentarily closes to momentarily restrain the movable portion of the steering mechanism until the force tending to move it decreases below a predetermined value.

In devices of this type which have been used in the past, difficulty has been experienced because of the fact that a piston rod projecting into one end of the cylinder decreases the piston valve area on that end proportionately to the decrease in area by the presence of the rod. This variation in area results in varying pressures being exerted on opposite sides of the piston valve which causes the valve to operate at lower pressures in one direction than in the other. Since the velocity pressure of the liquid through the piston ports controls the closure of the valve mechanism, the variation of piston area causes the valve to operate at a slower speed of the tie-rod or other moving element of the steering mechanism in one direction than in the other.

An object of this invention is to provide a valve member for a stabilizer which operates at the same speed in both directions.

A further object of the invention is to provide a hydraulic steering stabilizer comprising a piston slidably mounted in a cylinder and provided with novel valve means whereby the piston will be locked with reference to the cylinder when a predetermined pressure is exerted on the valve means in either direction.

Yet a further object is to provide a novel valve structure adapted for attachment to a rod slidably mounted in a liquid filled cylinder wherein the valve will actuate at equal velocity of rod travel in the cylinder in either direction.

A further object is to provide a piston and valve structure which will not score the inside of the cylinder.

Another object is to provide a pressure responsive valve structure adapted to be attached to the end of a rod and adapted to actuate at equal pressures in opposite directions.

Yet a still further object is to provide a steering stabilizer with a valve structure and an independent piston cooperating therewith having sufficient bearing surface that the valve structure will not score the cylinder wall as it moves longitudinally therein.

A further object is to provide an improved resilient end fitting for a stabilizer.

Another object is to provide a novel end fitting for a steering stabilizer embodying a universal connection and adjustable yielding means urging the universal connection in the direction to keep it tight.

Other objects and advantages of the invention will be apparent from the following detailed description, considered in connection with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 3 is an enlarged sectional view of the valve mechanism illustrated in dotted lines on Figure 1; and Figure 4 is a view similar to Figure 3 showing a modified form of valve structure.

Figure 1:
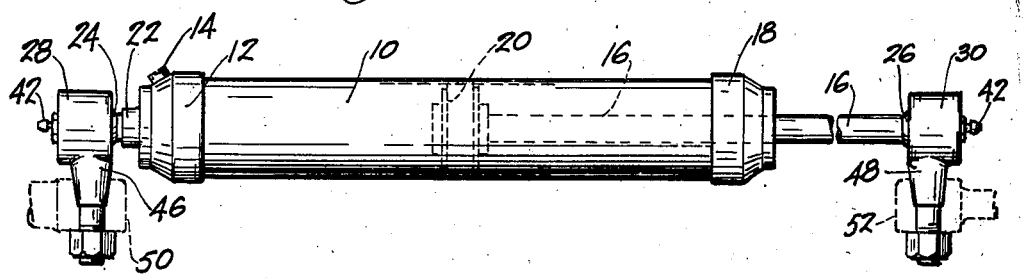
Figure 1 is a plan view of a stabilizer embodying the present invention.
Figure 2:
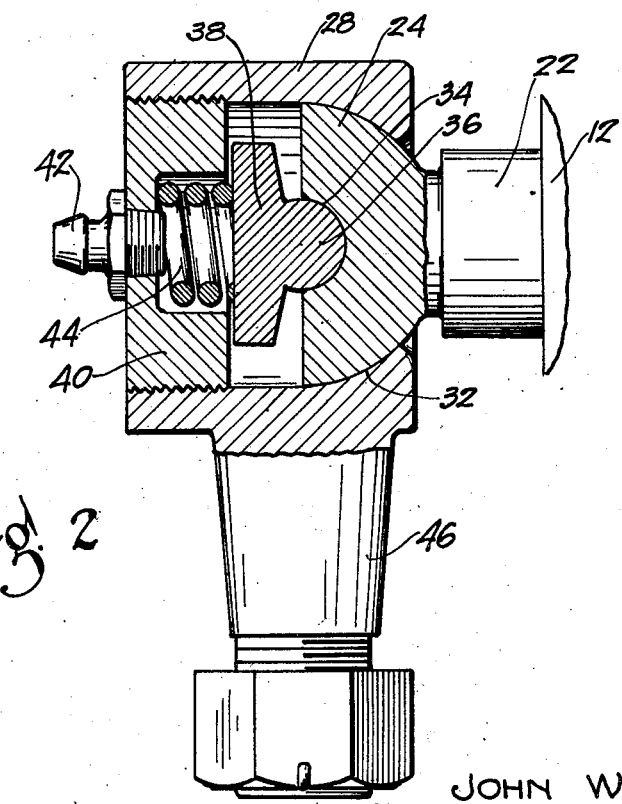
Figure 2 is a part sectional view of an improved end fitting for the stabilizer illustrated on Figure 1.

Referring more particularly to Figure 1 there is shown a stabilizer adapted to interconnect a fixed part and a movable part, and to permit movement at a predetermined speed, but to lock to prevent movement above said predetermined speed. The use of this stabilizer is particularly advantageous in connection with the steering mechanism of vehicles, and this use of the device will be particularly discussed; however, I do not desire to be limited to the use of my device in connection with vehicles, as it may be used in many other devices where it is desired to check the movement of a movable member at a predetermined speed.

The stabilizer preferably comprises a cylinder 10 closed at one end by a cap 12, having a plug 14 which may be removed to fill the cylinder with a liquid of suitable viscosity. A rod 16 projects through a cap 18 closing the other end of the cylinder 10. Suitable packing means associated with the cap 18 may be provided to seal the rod 16 from the escape of liquid through the cap 18.

The inner end of the rod 16 is provided with pressure responsive piston member 20, hereinafter more fully described. The closed end of the cylinder 10, or the cap 12 is provided with a fitting 22 having a partial spherical member 24, and the outer end of the rod 16 is provided with a partial spherical member 26. The partial spherical members 24 and 26 are similar, oppositely disposed, and adapted to be received in novel fittings 28 and 30.

The fittings 28 and 30 have partial spherical surfaces 32 adapted to receive the partial spherical members 24 and 26. The outer surfaces of the members 24 and 26 are provided with spherical indentations 34 adapted to receive spherical shaped projections 36 of a thrust receiving member 38 adapted to urge the partial spherical members 24 and 26 against the spherical surfaces 32 to maintain the unit in the assembled relation. A plug 40 having a grease fitting 42 may be threaded into the fittings 28. The thrust receiving member 38 is yieldingly urged by a spring 44 interposed between its outer face and a recess in the plug 40 to maintain the unit in the assembled relation. When the spring 44 is collapsed the flat face of member 38 abuts the inner face of plug 40 to prevent harmful distortion of the spring 44 which serves only to hold the parts in assembled relation.

The fittings 28 and 30 are provided with threaded projections 46 and 48 adapted to receive bracket or clamp members 50 and 52. One of the bracket or clamp members 50 or 52 may be fixed to a fixed portion of the vehicle chassis such for example as an axle, and the other bracket or clamp member may be fixed to a movable element of the steering mechanism of the vehicle, such for example as the tie-rod or steering arm or knuckle.

Referring now particularly to Figure 3, it will be observed that the piston member 20 carried by the rod 16 comprises a body member 60 having a plurality of apertures 62 extending longitudinally therethrough. The body member 60 may be clamped to the rod 16 by any desired means such, for example, as threaded members having radially extending shoulders 64 and 66. Spacer blocks 68 and 70 may be interposed between the shoulders 64 and 66 and the ends of the body member 60 respectively to form guides for and limit the movement of annular valve members 72 and 74 respectively. The valve members 72 and 74 are yieldingly urged apart and into engagement with the shoulders 64 and 66 by means such as springs 76 positioned in some of the apertures 62 of the body member 60.

The tension of the springs 76 may be selected as sufficient to hold the valve members 72 and 74 spaced from the body member 60 when the rod 16 moves in the cylinder 10 during normal operation of the device.

When the steering mechanism of the vehicle is subjected to an unusual shock, as when a tire is blown out, or an obstruction is encountered, the tie-rod or other movable element is subjected to increased force which will move the rod 16 with reference to the cylinder 10 at such a speed that the liquid cannot flow around the valve discs 72 and 74 and through the orifices 62. When this happens one of the valve members 72 or 74 will be moved by the velocity pressure of the liquid into engagement with the body member 60, compressing the springs 76 to stop the flow of fluid from one side of member 20 to the other side thereof.

When the orifices 62 are thus closed to the passage of liquid, the piston 20 and the rod 16 are temporarily locked with reference to the cylinder 10, and the steering mechanism will be held in the position in which it was at the instant when the shock was transmitted. When the force urging the rod 16 to close the valve decreases to such a point that the springs 76 overcome the force holding the valve closed, the orifices 62 will be again opened to the flow of liquid whereupon the steering mechanism will be released.

It will be noted that there is less liquid acting on the valve structure on the side to which the rod 16 is attached than on the other side due to the displacement of liquid by the rod. This unequal quantity of liquid acting on the opposite sides of the piston results in greater pressure being exerted in one direction than in the other. The pressure developed is of course a function of piston travel through the cylinder, and the unequal volume would normally result in the valves being actuated at different speeds, dependent on direction. To compensate for this variation, the effective area of the valve member 74 may be decreased by an amount equal to the volume of liquid displaced by the rod 16. This decrease in area may be accomplished by reducing the diameter of the valve 74 over the valve 72 as shown; by forming apertures of suitable size in the surface of the valve 74; or by reducing the gap between the valve member 74 and the piston 20.

The piston body member 60, being relatively wide, does not score the inner surface of the cylinder 10, and may be formed of any suitable material, extending over a wide range of hardness, from plastics such as Bakelite to hardened steel.

If desired, the valve members 74 and 72 may be actuated by independent springs of varying tension, the springs actuating the disc 74 being of less tension than those actuating the member 72 to compensate for the differential pressure on opposite sides of the body member 60 due to the pressure of the rod 16 adjacent the valve member 72.

The embodiment of the invention illustrated in Figure 4 is similar in many respects to that illustrated in Figure 3, corresponding parts having therefore been given corresponding reference numerals with the addition of 100. It will be noted that in this embodiment the shoulders 164 and 166 are the same height as the spacer blocks 168 and 170, and that stop members 180 and 182 are interposed between the respective shoulders and blocks to provide a stop for the valve members 172 and 174. The spring 176 acting in aperture 162 of piston 160, forces the discs 174 and 172 apart.

It will be observed that the valve member 174 is provided with apertures 184 to decrease the area to compensate for the variation of liquid volume on opposite sides of the body member 160 caused by the presence of the rod 116 engaging one side of the piston 120.

While the invention has been described with particular reference to a few illustrative embodiments, it is to be understood that the scope thereof is not to be limited to the features shown and described, nor otherwise than by the terms of the following claims.

I claim:

1. In a steering stabilizer for vehicles, a cylinder having a quantity of liquid therein, a rod slidable within the cylinder, valve means carried by the rod comprising an apertured body member, spaced discs adjacent the body member and adapted to close the apertures in the body member under certain operating conditions, and yielding means urging the spaced discs away from the body member, the area of the disc remote from the rod being less than the area of the disc adjacent the rod by an amount equal to the area of the rod.

2. In a steering stabilizer for vehicles, a cylinder having liquid therein, a rod slidably mounted in the cylinder, valve means carried by the rod comprising an apertured body member, threaded members on the rod having radially extending projections spaced on each side of the body member, spacer members positioned between each side of the body member and the radially extending projections, disc members supported by the spacer members and movable into engagement with the body member, and yielding means normally urging the disc members into engagement with said radially extending projections, the disc member on the side of the body member remote from the rod being smaller in area than the disc member on the side of the body member adjacent the rod by an amount equal to the area of the rod.

JOHN WILLIAM WHITE.